United States Patent
Ou

(10) Patent No.: US 6,318,002 B1
(45) Date of Patent: Nov. 20, 2001

(54) INTEGRALLY INJECTED SHOE INSOLE WITH A MIDDLE SHOE INSOLE

(76) Inventor: Shu-Mei Chang Ou, No. 22, Lane 215, Shui-Yuan Rd., Feng Yuan City, Taichung Hsien (TW)

(*) Notice: Subject to any disclaimer, the term of this patent is extended or adjusted under 35 U.S.C. 154(b) by 0 days.

(21) Appl. No.: 09/610,172

(22) Filed: Jul. 5, 2000

(51) Int. Cl.⁷ .................................................. A43B 23/00
(52) U.S. Cl. .................... 36/44; 36/3 B; 36/3 R
(58) Field of Search .................. 36/44, 3 R, 3 B

(56) References Cited

U.S. PATENT DOCUMENTS

| | | | |
|---|---|---|---|
| 325,785 | * | 9/1885 | Butterfield ............................ 36/44 |
| 945,698 | * | 1/1910 | Conway ................................ 36/44 |
| 1,597,672 | * | 8/1926 | Dahlquist ............................. 36/44 |
| 2,050,337 | * | 8/1936 | Kelley ................................ 36/3 R |
| 4,133,118 | * | 1/1979 | Khalsa et al. ........................ 36/44 |
| 4,186,499 | * | 2/1980 | Massock, Jr. et al. ................ 36/44 |
| 4,222,185 | * | 9/1980 | Giaccaglia .......................... 36/3 B |
| 4,223,458 | * | 9/1980 | Kihara ................................ 36/44 |
| 5,035,068 | * | 7/1991 | Biasi .................................. 36/44 |
| 5,220,791 | * | 6/1993 | Bulzomi ............................. 36/3 R |
| 5,584,130 | * | 12/1996 | Perron ................................ 36/44 |

FOREIGN PATENT DOCUMENTS

| | | | |
|---|---|---|---|
| 4332606 | * | 6/1994 | (DE) .................................. 36/3 B |
| 168 725 | * | 9/1921 | (GB) .................................. 36/44 |

* cited by examiner

*Primary Examiner*—Paul T. Sewell
*Assistant Examiner*—Troy Arnold
(74) *Attorney, Agent, or Firm*—Dellett and Walters

(57) ABSTRACT

An integrally injected shoe insole with a middle shoe insole has a plastic layer, a middle shoe insole layer and a web layer. Multiple meshes are defined on the web layer, and multiple connecting rods extend through the middle shoe insole layer to integrally connect to the plastic layer and form an integral layer structure comprising, from top to bottom, the plastic layer, the middle shoe insole layer and the web layer.

9 Claims, 5 Drawing Sheets

INTEGRALLY INJECTED SHOE INSOLE WITH A MIDDLE SHOE INSOLE

BACKGROUND OF THE INVENTION

1. Field of the Invention

The present invention relates to a shoe insole, and more particularly to an integrally injected shoe insole that contains a middle shoe insole.

2. Description of Related Art

With reference to FIG. 4, a conventional shoe insole (80) has a insole (60) mounted on the top of the insole (80). The insole (60) has multiple protrusions (61) extending upward from the top. The protrusions (61) serve to enhance the air circulation in the shoe and to massage the feet of the user. However, the protrusions (61) still do not prevent odor or moisture from accumulating or absorb shock.

With reference to FIG. 5, a conventional shoe insole for improving the above-mentioned problems comprises an upper layer (70), a lower layer (72) and a middle layer (71). The upper layer (70) contains multiple protrusions (700) evenly distributing on the top surface. The lower layer (72) is formed of paper or foam material, and the middle layer (71) is formed of cloth or a non-woven web. This type of conventional shoe insole can enhance air circulation by the protrusions (700) of the upper layer (70) and can absorb shock by the thick lower layer (72). However, the three layers (70, 71, 72) of this type of conventional shoe insole are bound together by means of stitching or adhesive. Thus, the manufacturing steps of this type of conventional shoe insole are complicated. Air still does not circulate well in this type of conventional shoe insole. As a result, an unpleasant odor accumulates in the insole and the shoe after the shoe has been worn for a long term of time.

The present invention has arisen to mitigate and/or obviate the disadvantages of the conventional shoe insoles.

SUMMARY OF THE INVENTION

The objective of the present invention is to provide an integrally injected shoe insole with a middle shoe insole. To achieve the objective of the present invention, the integrally injected shoe insole with a middle shoe insole in accordance with the present invention has a plastic layer, an middle shoe insole layer and a web layer. Multiple meshes are defined on the web layer, and multiple connecting rods extend through the middle shoe insole layer to integrally connect to the plastic layer forming an integral layer structure comprising, from top to bottom, the plastic layer, the middle shoe insole layer and the web layer.

Further benefits and advantages of the present invention will become apparent after a careful reading of the detailed description with appropriate reference to the accompanying drawings.

DETAILED DESCRIPTION OF THE INVENTION

Figure 1:
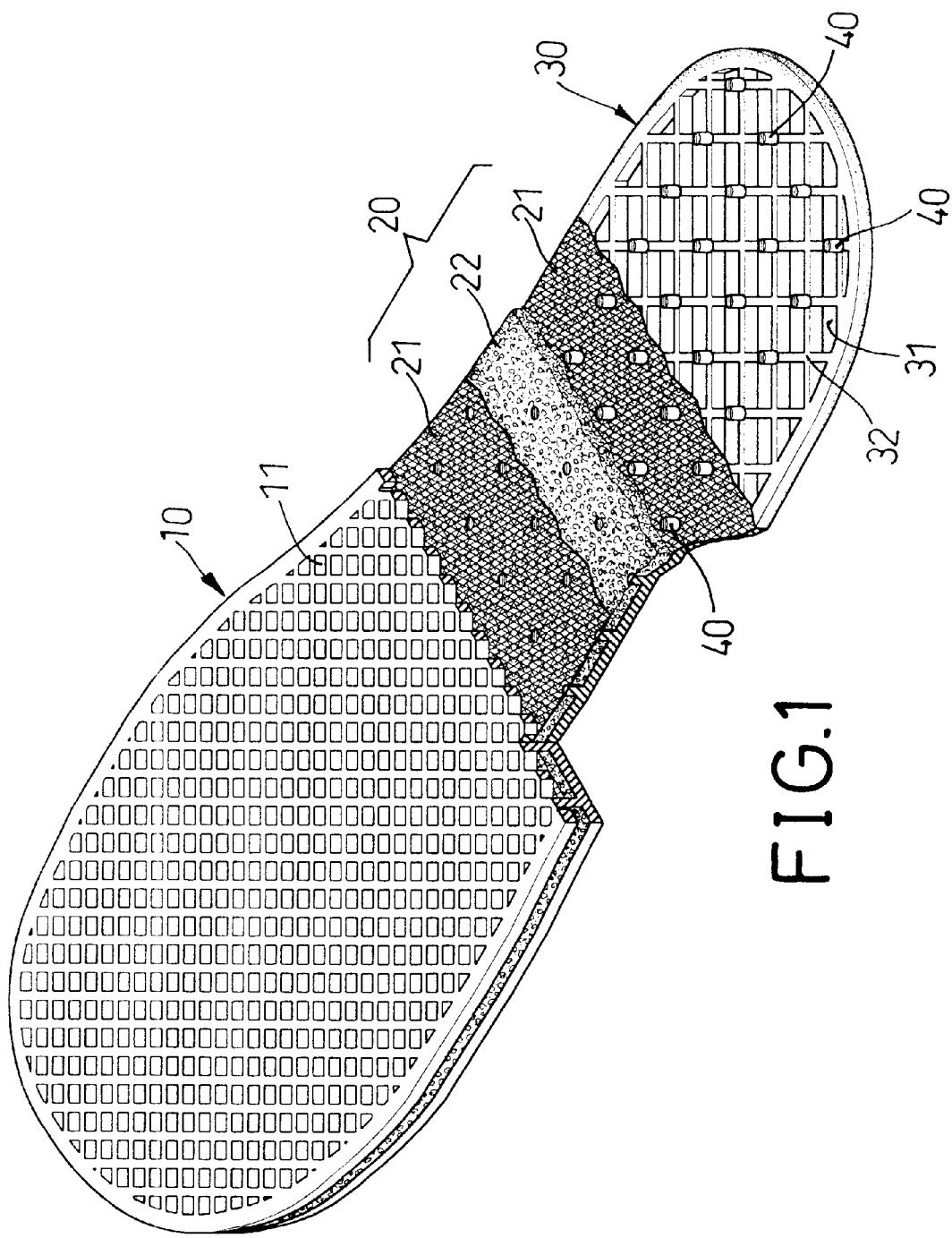
FIG. 1 is a perspective view in partial section of the integrally injected shoe insole with a middle shoe insole in accordance with the present invention.
Figure 2:
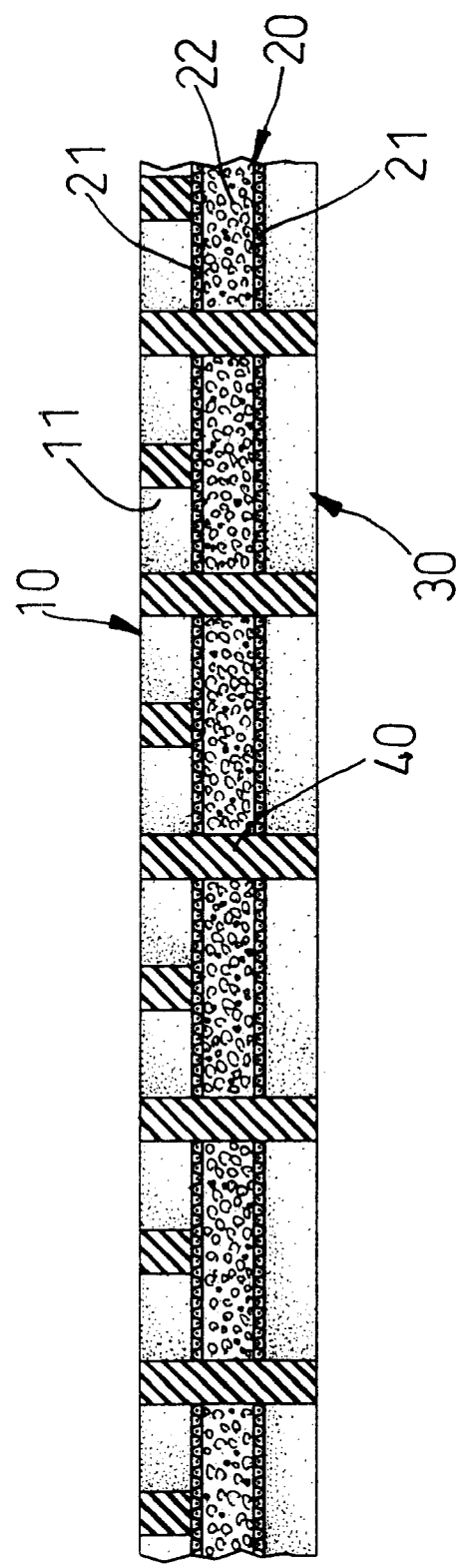
FIG. 2 is a cross sectional view of the integrally injected shoe insole with a middle shoe insole in FIG. 1.

With reference to FIGS. 1 and 2, the integrally injected shoe insole with a middle shoe insole in accordance with the present invention comprises a plastic layer (10), a middle shoe insole layer (20) and a web layer (30).

Multiple apertures (11) are defined in the plastic layer (10) to allow air to circulate. The plastic layer (10) can has a flat upper surface and can be in the form of a web.

The middle shoe insole layer (20) is positioned under the plastic layer (10). In one embodiment of the present invention, the middle shoe insole layer (20) comprises an intermediate layer (22) sandwiched between two fiber layers (21). The fiber layer (21) can be made of natural fibers or artificial fibers, and the intermediate layer (22) can be an active carbon layer or porcelain grain layer. Multiple through holes are defined through the middle shoe insole layer (20).

The web layer (30) is positioned under the middle shoe insole layer (20) with multiple meshes (31) defined on the web layer (30). Multiple connecting rods (40) extend through the middle shoe insole layer (20) to integrally connect to the plastic layer (10) to form an integral layer structure comprising, from top to bottom, the plastic layer (10), the middle shoe insole layer (20) and the web layer (30).

To achieve the above-mentioned structure of the shoe insole, the middle shoe insole layer (20) is put into a mold. Then, molten plastic is poured into the mold through the through holes of the middle shoe insole layer (20) to form the multiple connecting rods (40) and the plastic layer (10). Afterwards, molten plastic is injected by a mold to form the web layer (30) under the middle shoe insole layer (20). The web layer (30) contains multiple joints (32) that correspond to the connecting rods (40) to allow the plastic layer (10) to connect to the web layer (30) by the connecting rods (40). Thus, the shoe insole in accordance with the present invention contains integrally connected layers including, from top to the bottom, a plastic layer (10), a middle shoe insole layer (20) and a web layer (30).

Figure 3:
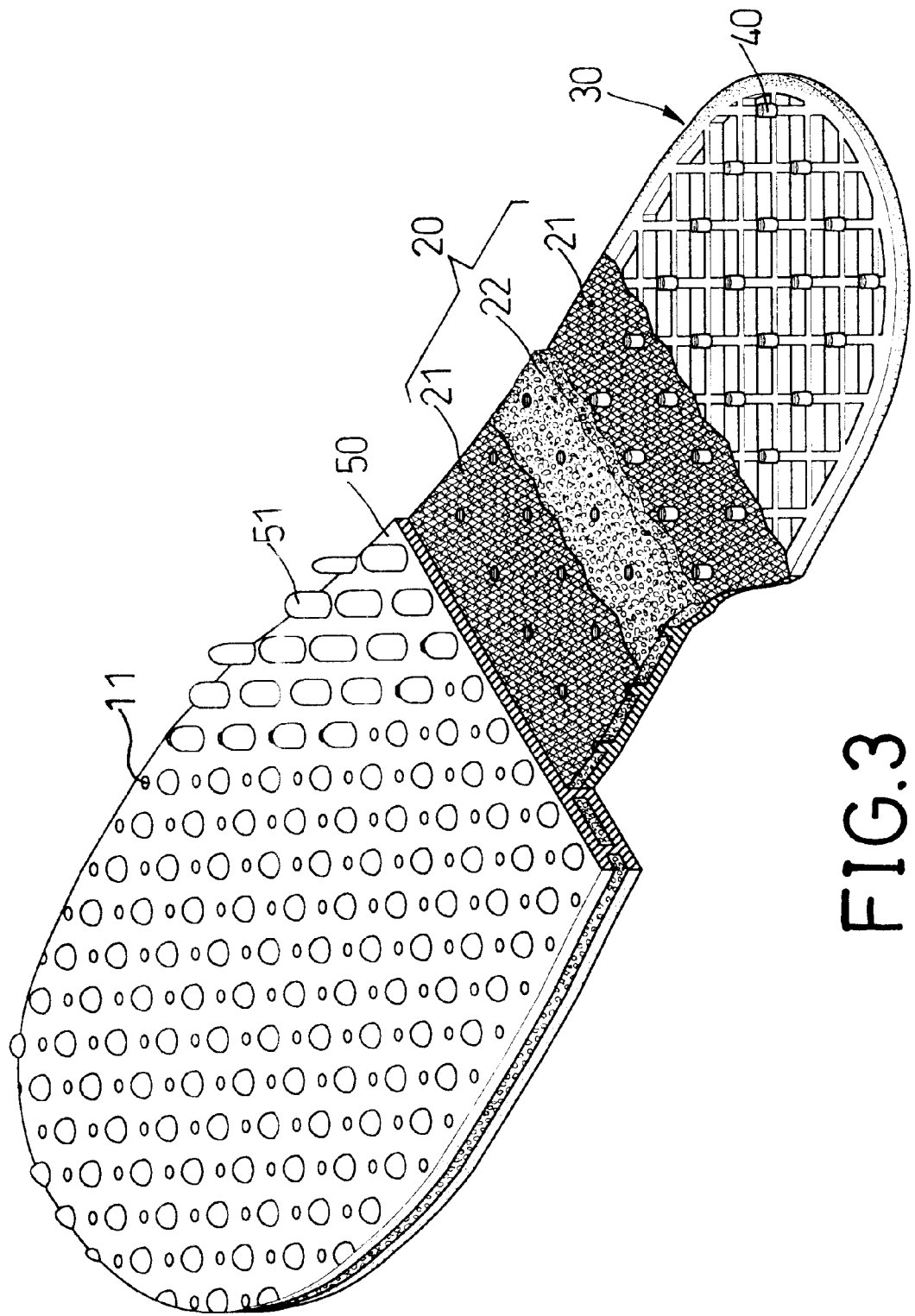
FIG. 3 is a perspective view in partial of another embodiment of the integrally injected shoe insole with a middle shoe insole in accordance with the present invention.
Figure 4:
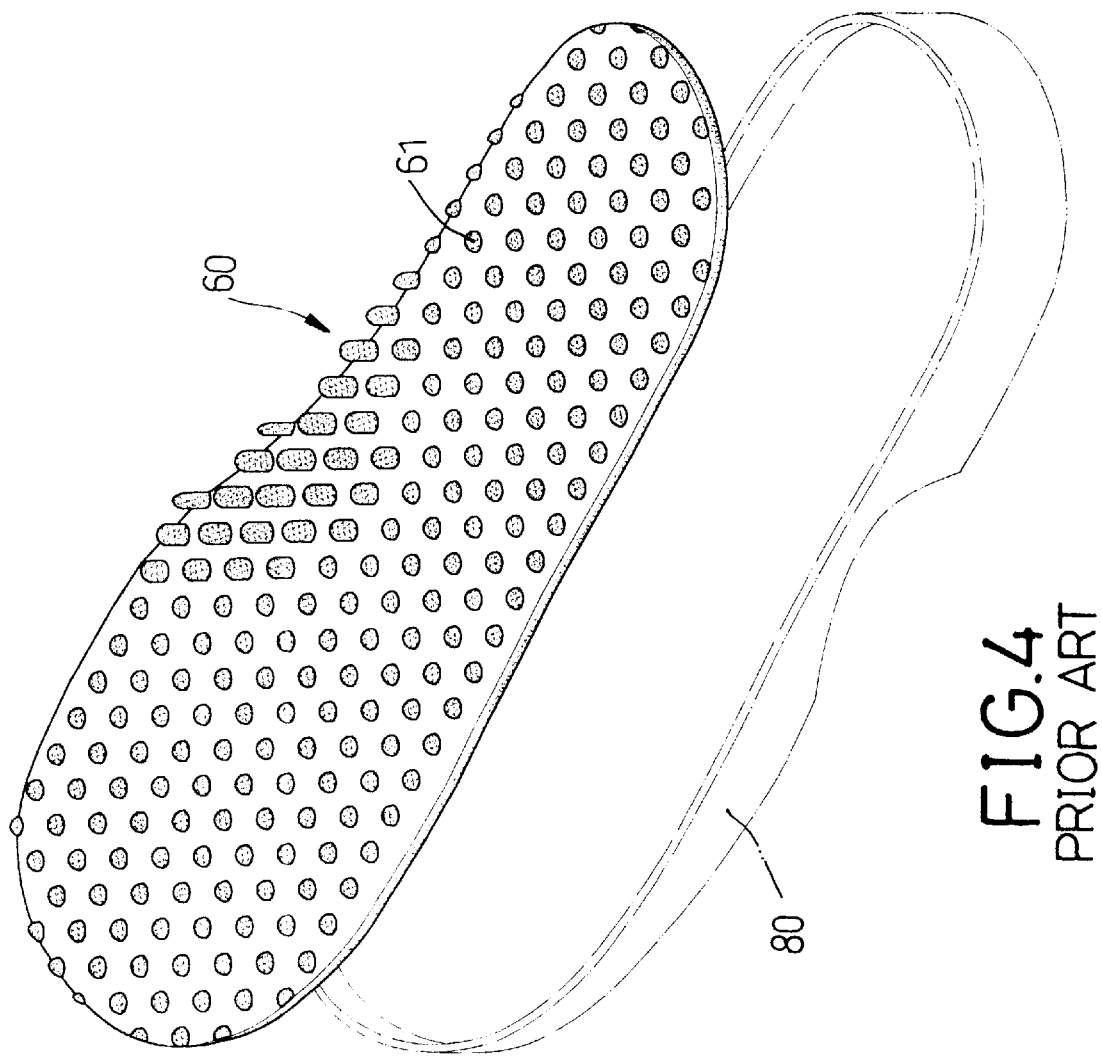
FIG. 4 is a perspective view of a conventional shoe insole.
Figure 5:
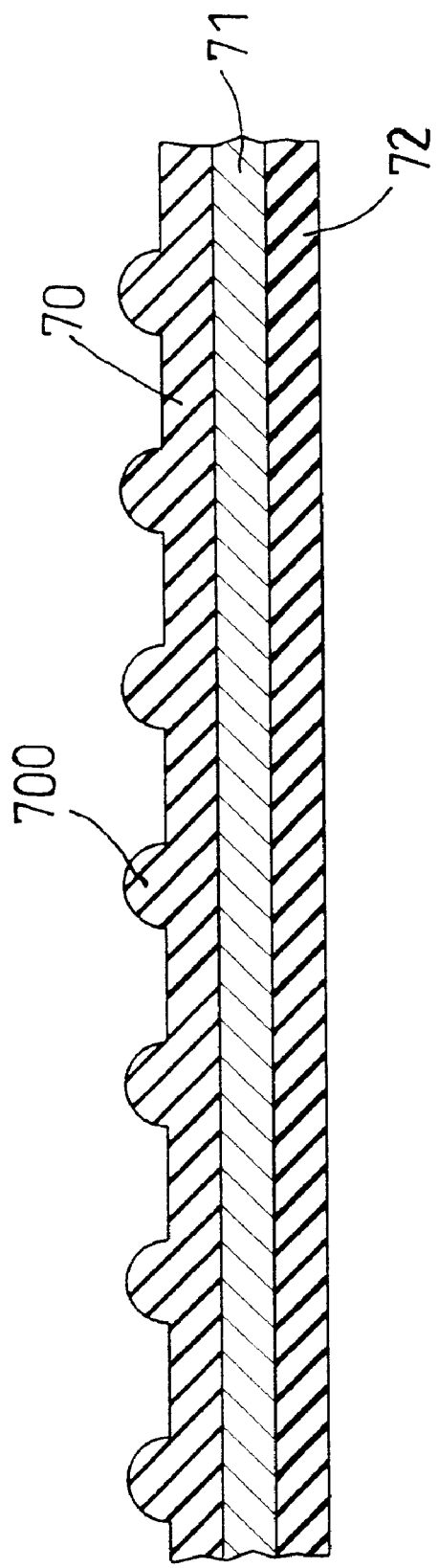
FIG. 5 is a cross sectional view of another conventional shoe insole.

With reference to FIG. 3, another embodiment of the shoe insole in accordance with the present invention has a plastic layer (10) having an upper surface comprising multiple protrusions (50) extending up and distributed among the apertures (11).

Although the invention has been explained in relation to its preferred embodiment, it is to be understood that many other possible modifications and variations can be made without departing from the spirit and scope of the invention as hereinafter claimed.

What is claimed is:

1. An integrally injected shoe insole with a middle shoe insole, comprising:

plastic layer (10) having multiple apertures (11) defined on the plastic layer (10);

an middle shoe insole layer (20) defined under the plastic layer (10); and a web layer (30) defined under the middle shoe insole layer (20), and having multiple meshes (31) defined on the web layer (30) and having multiple connecting rods (40) extending through the middle shoe insole layer (20) integrally connected to the plastic layer (10) to form an integral layer structure comprising, from top to bottom, the plastic layer (10), the middle shoe insole layer (20) and the web layer (30).

2. The integrally injected shoe insole with a middle shoe insole as claimed in claim 1, wherein the middle shoe insole layer (20) comprises an intermediate layer (22) sandwiched between two fiber layers (21).

3. The integrally injected shoe insole with a middle shoe insole as claimed in claim 2, wherein the intermediate layer (22) is an active carbon layer.

4. The integrally injected shoe insole with a middle shoe insole as claimed in claim 2, wherein the intermediate layer (22) is a porcelain grain layer.

5. The integrally injected shoe insole with a middle shoe insole as claimed in claim 1, wherein the plastic layer (10) has a flat upper surface.

6. The integrally injected shoe insole with a middle shoe insole as claimed in claim 1, wherein the plastic layer (10) is in the form of a web.

7. The integrally injected shoe insole with a middle shoe insole as claimed in claim 1, wherein the plastic layer (10) having an upper surface comprising multiple protruding rods extending up from the plastic layer (10).

8. The integrally injected shoe insole with a middle shoe insole as claimed in claim 1, wherein the plastic layer (10) having an upper surface comprising multiple protruding blocks extending up from the plastic layer (10).

9. The integrally injected shoe insole with a middle shoe insole as claimed in claim 1, wherein the connecting rods (40) respectively extend from the joints (32) of the web layer (30).

* * * * *